United States Patent
Hikata et al.

(10) Patent No.: US 9,096,434 B2
(45) Date of Patent: Aug. 4, 2015

(54) METHOD AND APPARATUS FOR MANUFACTURING CARBON NANOSTRUCTURE, AND CARBON NANOSTRUCTURE ASSEMBLY

(71) Applicants: SUMITOMO ELECTRIC INDUSTRIES, LTD., Osaka-shi, Osaka (JP); Risa Utsunomiya, Kyoto, Kyoto (JP); Yugo Higashi, Kyoto, Kyoto (JP)

(72) Inventors: Takeshi Hikata, Osaka (JP); Soichiro Okubo, Osaka (JP); Risa Utsunomiya, Kyoto (JP); Yugo Higashi, Kyoto (JP)

(73) Assignees: Sumitomo Electric Industries, Ltd., Osaka-shi, Osaka (JP); Nissin Electric Co., Ltd., Kyoto-shi, Kyoto (JP)

( * ) Notice: Subject to any disclaimer, the term of this patent is extended or adjusted under 35 U.S.C. 154(b) by 13 days.

(21) Appl. No.: 13/875,790

(22) Filed: May 2, 2013

(65) Prior Publication Data
US 2013/0302552 A1 Nov. 14, 2013

(30) Foreign Application Priority Data
May 11, 2012 (JP) ................. 2012-109661

(51) Int. Cl.
*C01B 31/02* (2006.01)
*B01J 19/00* (2006.01)
*B01J 15/00* (2006.01)
(Continued)

(52) U.S. Cl.
CPC ............. *C01B 31/0226* (2013.01); *B01J 4/008* (2013.01); *B01J 15/005* (2013.01); *B01J 19/00* (2013.01);
(Continued)

(58) Field of Classification Search
CPC .. C01B 31/02; C01B 31/0226; C01B 31/022; C01B 31/0233; C01B 31/024; C01B 31/0246; C01B 31/0253; C01B 31/026; C01B 31/0273; C01B 31/028; C01B 31/0286; C01B 31/0293; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B01J 19/00; B01J 15/005; B01J 19/1887; B01J 4/008; B01J 2219/00058; B01J 2219/00135; B82Y 40/00; B82Y 30/00; B82Y 5/00; B82Y 10/00; B82Y 15/00; B82Y 20/00; B82Y 25/00; B82Y 35/00; B82Y 99/00; Y10T 428/19; D01F 9/10; D01F 9/127; D01F 9/1271; D01F 9/1272; D01F 9/1273; D01F 9/1274; D01F 9/1275; D01F 9/1276; D01F 9/1277; D01F 9/1278
USPC ........ 423/447.1–447.3, 445 B; 977/742–754, 977/842–848
See application file for complete search history.

(56) References Cited

U.S. PATENT DOCUMENTS
2005/0170089 A1* 8/2005 Lashmore et al. ......... 427/248.1

FOREIGN PATENT DOCUMENTS
JP 2005330175 A 12/2005

*Primary Examiner* — Daniel C McCracken
(74) *Attorney, Agent, or Firm* — Drinker Biddle & Reath LLP

(57) ABSTRACT

There is provided a method for manufacturing a carbon nanostructure with reduced occurrence of a bend and the like. The method for manufacturing a carbon nanostructure according to the present invention includes the steps of: preparing a base body formed of a catalyst member including a catalyst and a separation member that are in contact with or integral with each other (preparation step); oxidizing at least a part of a contact portion or integral portion of the catalyst member and the separation member (oxidation step); bringing a carbon-containing source gas into contact with the catalyst member and/or the separation member (CNT growth step); and growing a carbon nanostructure (CNT growth step). In the CNT growth step, the carbon nanostructure is grown in a separation interface region between the catalyst member and the separation member, by heating the base body while separating the separation member from the catalyst member.

14 Claims, 11 Drawing Sheets

(51) Int. Cl.
 *B01J 19/18* (2006.01)
 *B01J 4/00* (2006.01)
 *B82Y 40/00* (2011.01)
 *B82Y 30/00* (2011.01)

(52) U.S. Cl.
 CPC ............ *B01J 19/1887* (2013.01); *B82Y 30/00* (2013.01); *B82Y 40/00* (2013.01); *B01J 2219/00058* (2013.01); *B01J 2219/00135* (2013.01); *Y10T 428/19* (2015.01)

METHOD AND APPARATUS FOR MANUFACTURING CARBON NANOSTRUCTURE, AND CARBON NANOSTRUCTURE ASSEMBLY

BACKGROUND OF THE INVENTION

1. Field of the Invention

The present invention relates to a method and an apparatus for manufacturing a carbon nanostructure, and a carbon nanostructure assembly, and more particularly to a method and an apparatus for manufacturing a carbon nanostructure that extends in one direction, and a carbon nanostructure assembly.

2. Description of the Background Art

Conventionally, there has been known a carbon nanostructure including a linear structure in which carbon atoms are aligned in a nanometer-level diameter and a sheet-like structure constituted by carbon atoms and having a nanometer-level thickness, which are typified by carbon nanotube, graphene and the like. As a method for manufacturing such carbon nanostructure, there has been proposed a method for supplying a carbon-containing source gas to a heated fine catalyst, thereby growing a carbon nanostructure from the catalyst (refer to, for example, Japanese Patent Laying-Open No. 2005-330175).

SUMMARY OF THE INVENTION

In the conventional method, however, a bend occurred in some cases at the carbon nanostructure grown from the catalyst. As for the carbon nanotube, for example, a five-membered ring or seven-membered ring, not a six-membered ring forming the carbon nanotube, was present in the portion where the bend occurred, and thus, the properties of the carbon nanotube changed locally (e.g., the electrical resistance became high).

In order to reduce occurrence of the bend at the carbon nanostructure described above, applying a tension to the carbon nanostructure during growth of the carbon nanostructure was also contemplated. It was difficult, however, to chuck a tip of the fine carbon nanostructure grown from the catalyst and apply a tension to the carbon nanostructure.

The present invention has been made to solve the above-described problem, and an object of the present invention is to provide a method for manufacturing a carbon nanostructure with reduced occurrence of a bend and the like, and a manufacturing apparatus used in the method for manufacturing a carbon nanostructure, and further, a carbon nanostructure assembly with reduced occurrence of a bend.

A method for manufacturing a carbon nanostructure according to the present invention includes the steps of: preparing a base body formed of a catalyst member including a catalyst and a separation member that are in contact with or integral with each other; oxidizing at least a part of a contact portion or integral portion of the catalyst member and the separation member in the base body; bringing a carbon-containing source gas into contact with the catalyst member and/or the separation member; and growing a carbon nanostructure. In the step of growing a carbon nanostructure, a carbon nanostructure is grown in a separation interface region between the catalyst member and the separation member, by heating the base body while separating the separation member from the catalyst member.

With this, the carbon nanostructure with reduced deformation such as a bend, which extends from the catalyst member to the separation member, can be easily grown in the separation interface region between the catalyst member and the separation member. In addition, since at least a part of the contact portion of the catalyst member and the separation member is preliminarily oxidized, the carbon nanostructure can be efficiently grown in the step of growing a carbon nanostructure.

An apparatus for manufacturing a carbon nanostructure according to the present invention includes: a holding portion; a driving member; a gas supply portion; and a heating member. The holding portion is capable of holding a base body formed of a catalyst member including a catalyst and a separation member that are in contact with or integral with each other, on a catalyst member side and on a separation member side. The driving member moves the holding portion to separate the separation member from the catalyst member. The gas supply portion supplies a reaction gas to the base body. The heating member heats the base body. By using such apparatus, the carbon nanostructure with reduced bend can be grown in the separation interface region between the catalyst member and the separation member.

A carbon nanostructure assembly according to the present invention includes: a holding member including a pair of holding portions arranged to face each other; and a plurality of carbon nanostructures formed to connect the pair of holding portions. With this, the carbon nanostructure having a tension applied between the holding portions can be easily handled.

As described above, according to the present invention, the carbon nanostructure with reduced bend can be obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
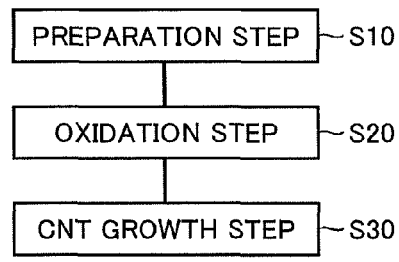
FIG. 1 is a flowchart for describing a method for manufacturing a carbon nanostructure according to a first embodiment of the present invention.

Embodiments of the present invention will be described hereinafter with reference to the drawings, in which the same reference numerals are given to the same or corresponding portions and description thereof will not be repeated.

(First Embodiment)

A method for manufacturing a carbon nanostructure according to a first embodiment of the present invention will be described with reference to FIGS. 1 to 4.

Referring to FIG. 1, in the method for manufacturing the carbon nanostructure according to the present invention, a preparation step (S10) is first performed. In this step (S10), a base body formed of a catalyst member including a catalyst and a separation member that are in contact with or integral with each other is prepared.

Figure 2:
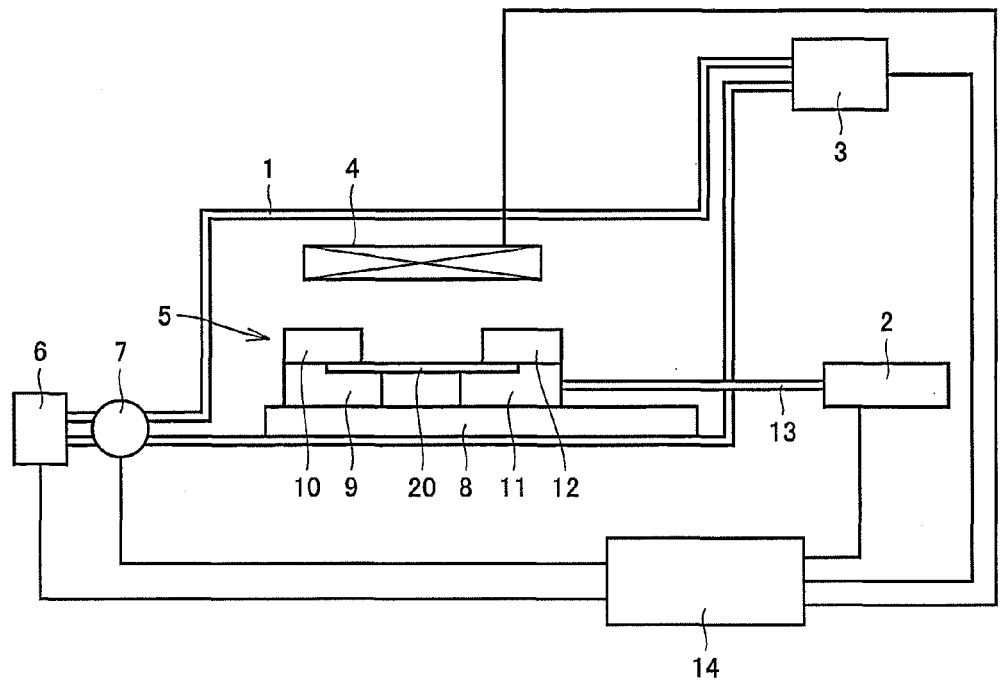
FIG. 2 is a schematic cross-sectional view for describing an apparatus for manufacturing the carbon nanostructure according to the present invention, which is used in the method for manufacturing the carbon nanostructure shown in FIG. 1.
Figure 3:
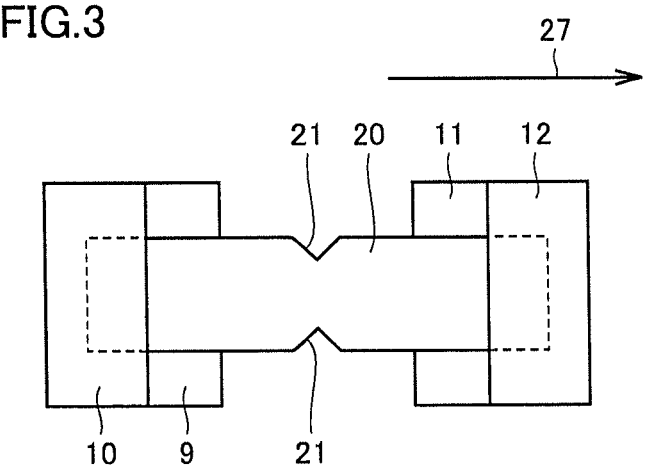
FIG. 3 is a partial schematic view of the apparatus for manufacturing the carbon nanostructure shown in FIG. 2.

As shown in FIGS. 2 and 3, a metal sheet (metal foil) serving as a catalyst can be used as a base body 20. Pure iron, nickel, cobalt and the like can, for example, be used as the metal. A notch 21, which is a recessed portion for defining a position of fracture in a CNT growth step (S30) (refer to FIG. 1) described below, is preferably formed in base body 20. When the metal foil as shown in FIGS. 2 and 3 is used as base body 20, the metal foil forms the above-described catalyst member and separation member that are integral with each other.

An apparatus for manufacturing the carbon nanostructure for performing the method for manufacturing the carbon nanostructure will now be described with reference to FIGS. 2 and 3. As shown in FIG. 2, the apparatus for manufacturing the carbon nanostructure includes a reaction chamber 1, a heating member 4 arranged within reaction chamber 1, quartz blocks 9 to 12 arranged to face heating member 4, for holding base body 20, a base platform 8 for supporting quartz blocks 9 to 12, a driving member 2 coupled to quartz block 11 by a coupling rod 13, a gas supply portion 3 for supplying a source gas and the like to reaction chamber 1, a pump 7 and a discharge portion 6 for discharging the gas from reaction chamber 1, and a controller 14 for controlling heating member 4, gas supply portion 3, driving member 2, pump 7, and discharge portion 6.

Quartz blocks 9 to 12 are arranged on base platform 8 within reaction chamber 1. One end of base body 20 is grasped by quartz blocks 9 and 10. The other end of base body 20 is grasped by quartz blocks 11 and 12. Quartz block 11 is movable on base platform 8. On the other hand, quartz blocks 9 and 10 are fixed to base platform 8.

Heating member 4 is arranged to face base body 20 fixed by quartz blocks 9 to 12. Although heating member 4 is arranged within reaction chamber 1, heating member 4 may be arranged outside reaction chamber 1 when a wall of reaction chamber 1 is formed by a translucent member such as quartz. An arbitrary heating device such as an electrothermal heater can, for example, be used as heating member 4.

Base body 20 prepared in the above-described step (S10) is arranged within reaction chamber 1 of the manufacturing apparatus as shown in FIGS. 2 and 3.

Next, an oxidation step (S20) is performed. In this step, at least a part of a contact portion of the catalyst member and the separation member in base body 20 is oxidized. Specifically, by setting the atmosphere within reaction chamber 1 to the air atmosphere and heating base body 20 by heating member 4, base body 20 is oxidized.

Figure 4:
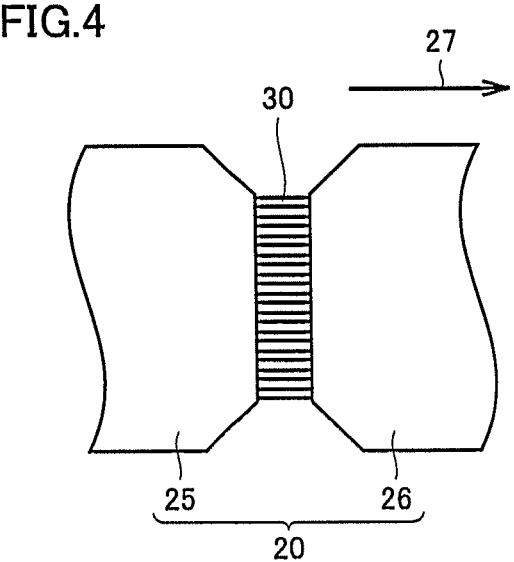
FIG. 4 is a schematic view showing the formed carbon nanostructure.

Next, the CNT growth step (S30) is performed. In this step (S30), the carbon nanostructure is grown. Specifically, in this step (S30), base body 20 is heated by heating member 4 and a carbon-containing source gas is supplied from gas supply portion 3 to reaction chamber 1. Then, a step of bringing the source gas into contact with base body 20 including the catalyst member is performed. Then, quartz blocks 11 and 12 are moved by driving member 2 in a direction shown by an arrow 27 in FIG. 3. As a result, as shown in FIG. 4, base body 20 is fractured at the portion where notch 21 was formed. In this state (i.e., while separating the separation member, which is a base body portion 26 of base body 20 on the side grasped by quartz blocks 11 and 12, from the catalyst member, which is a base body portion 25 of base body 20 on the side grasped by quartz blocks 9 and 10), base body 20 is heated by heating member 4 as described above. As a result, as shown in FIG. 4, a carbon nanostructure 30 is grown in a fracture interface region of base body 20 that is a separation interface region between the catalyst member and the separation member.

With this, carbon nanostructure 30 with reduced deformation such as a bend, which extends from base body portion 25 to base body portion 26, can be easily grown in the fracture interface region of base body 20. In addition, since at least a part of base body 20 is preliminarily oxidized, carbon nanostructure 30 can be efficiently grown in the step of growing carbon nanostructure 30.

In regard to the step of supplying the carbon-containing source gas from gas supply portion 3 to reaction chamber 1, bringing the source gas into contact with base body 20, and then, fracturing (separating) base body 20, it is preferable to perform the step of fracturing (separating) base body 20 after the fracture interface region of base body 20 is reduced from oxidation.

In addition, in the step of fracturing base body 20, it is preferable to move coupling rod 13 and quartz blocks 11 and 12 by driving member 2, while controlling a tension to prevent formed carbon nanostructure 30 from being fractured. Furthermore, it is preferable to take measures to suppress carburization from the carbon-containing source gas (i.e., prevent embrittlement) by, for example, preliminarily covering a surface of a portion of base body 20 other than the fracture interface region with a coating film such as a film made of precious metal including gold, an oxide and the like.

(Second Embodiment)

An apparatus for manufacturing a carbon nanostructure according to a second embodiment of the present invention will be described with reference to FIG. 5.

Figure 5:
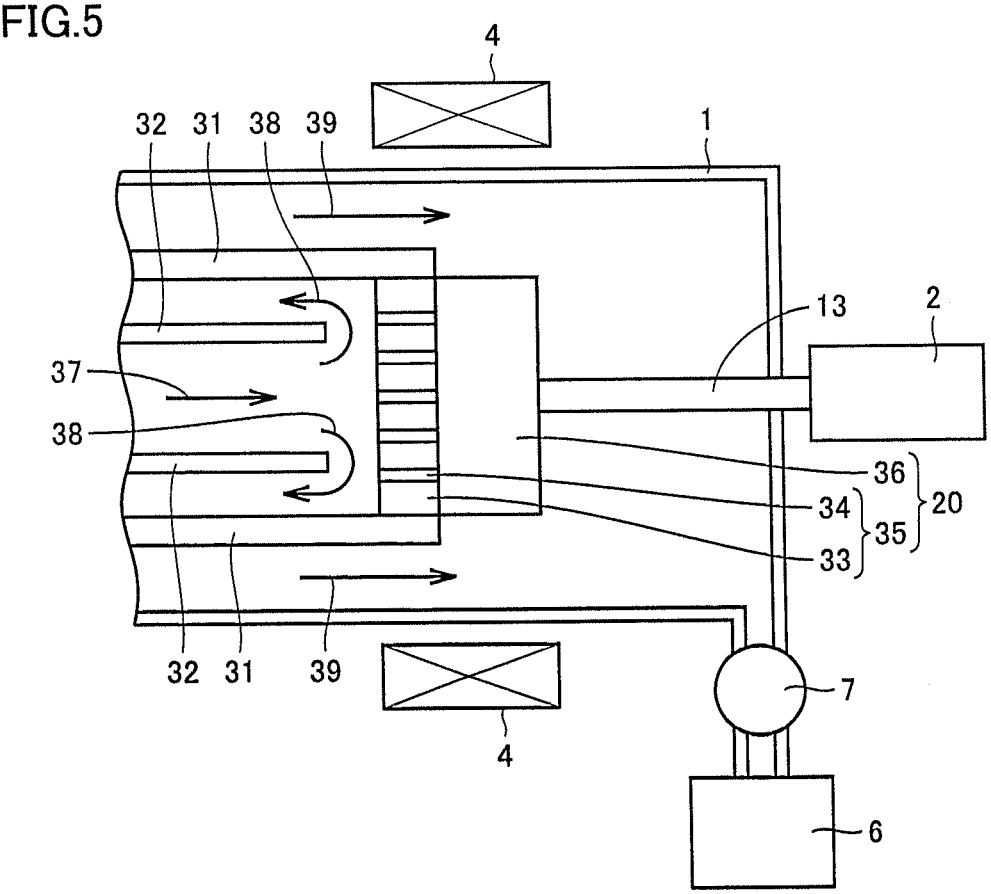
FIG. 5 is a schematic cross-sectional view for describing an apparatus for manufacturing a carbon nanostructure according to a second embodiment of the present invention.

Referring to FIG. 5, the apparatus for manufacturing the carbon nanostructure includes reaction chamber 1, heating member 4 arranged outside reaction chamber 1, a diaphragm 31 connected to a catalyst member 35 forming base body 20 in order to hold catalyst member 35 at a position facing heating member 4, a separation member 36 arranged in contact with catalyst member 35, driving member 2 coupled to separation member 36 by coupling rod 13, the gas supply portion (not shown) for supplying the source gas and the like to reaction chamber 1, pump 7 and discharge portion 6 for discharging the gas from reaction chamber 1, and the controller (not shown) for controlling heating member 4, the gas supply portion, driving member 2, pump 7, and discharge portion 6. Catalyst member 35 has, for example, a circular planar shape, and diaphragm 31 connected to catalyst member 35 has, for example, a cylindrical shape. A guide tube 32 for guiding the source gas is arranged within diaphragm 31. The source gas flows through guide tube 32 as shown by an arrow 37 and is supplied to the rear surface side of catalyst member 35. After the source gas reaches the rear surface of catalyst member 35, the source gas flows along an outer circumference of guide tube 32 (space between guide tube 32 and an inner circumference of diaphragm 31) as shown by an arrow 38 and is discharged from within diaphragm 31. A gas (purge gas) different from the source gas is also supplied to a space between an outer circumference of diaphragm 31 and an inner circumferential surface of reaction chamber 1 as shown by an arrow 39.

As shown in FIG. 5, catalyst member 35 is formed of a porous member 33 and a catalyst 34 filled into an opening formed in porous member 33 (through hole penetrating from a rear surface to a front surface of porous member 33). Catalyst 34 is arranged to extend from the rear surface side of porous member 33 facing the inner circumferential side of diaphragm 31 to the front surface side of porous member 33 that is in contact with separation member 36. Nanoporous alumina or nanoporous silicon can, for example, be used as porous member 33. Pure iron or an oxide thereof can, for example, be used as catalyst 34. A pure iron block (or a block body and the like having a pure iron layer formed only on a surface that is in contact with catalyst member 35) can be used as separation member 36. Catalyst member 35 may also be formed by, for example, using silver or gold as a material for porous member 33 and using pure iron as catalyst 34 and making a composite of these materials by plastic working and the like, or may be formed by a fine processing technique using a semiconductor process and the like.

Next, a method for manufacturing the carbon nanostructure using the apparatus for manufacturing the carbon nanostructure shown in FIG. 5 will be described. Although the method for manufacturing the carbon nanostructure is basically similar to the method for manufacturing the carbon nanostructure shown in FIG. 1, the former is different from the latter in terms of a configuration of base body 20 prepared in the preparation step (S10). In other words, when the apparatus shown in FIG. 5 is used, a member obtained by joining catalyst member 35 and separation member 36 described above is prepared as base body 20. An arbitrary method such as welding and pressure joining can be used as a method for joining catalyst member 35 and separation member 36. However, catalyst 34 of catalyst member 35 must be in contact with separation member 36.

As shown in FIG. 5, catalyst member 35 of prepared base body 20 is fixed to an end of diaphragm 31 and separation member 36 of prepared base body 20 is connected to coupling rod 13.

Next, the oxidation step (S20) is performed similarly to the manufacturing method shown in FIG. 1. In this step, at least a part of the contact portion of catalyst member 35 and separation member 36 in base body 20 is oxidized. Specifically, by setting the internal atmosphere within reaction chamber 1 or on the inner circumferential side of diaphragm 31 to the oxygen-containing atmosphere and heating base body 20 by heating member 4, base body 20 is oxidized.

Figure 6:
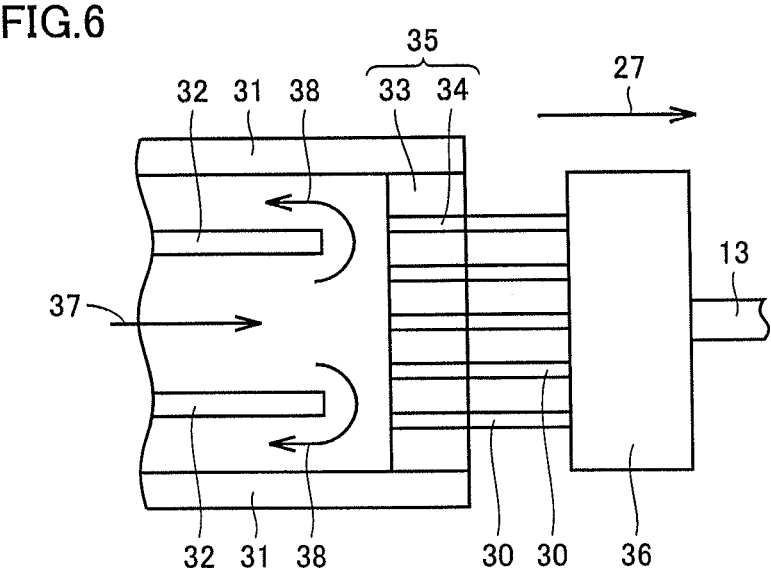
FIG. 6 is a schematic view showing the carbon nanostructure formed by the apparatus for manufacturing the carbon nanostructure shown in FIG. 5.

Next, the CNT growth step (S30) is performed similarly to the manufacturing method shown in FIG. 1. Specifically, in this step (S30), base body 20 is heated by heating member 4 and the carbon-containing source gas is supplied from the gas supply portion through guide tube 32 to the rear surface side of catalyst member 35. Then, with the source gas being in contact with base body 20 including catalyst member 35, separation member 36 is moved by driving member 2 in a direction shown by an arrow 27 in FIG. 6. As a result, as shown in FIG. 6, carbon nanostructure 30 is grown in a separation interface region between catalyst member 35 and separation member 36.

With this, carbon nanostructure 30 with reduced deformation such as a bend, which extends from catalyst member 35 to separation member 36, can be easily grown in the separation interface region between catalyst member 35 and separation member 36.

(Third Embodiment)

An apparatus for manufacturing a carbon nanostructure according to a third embodiment of the present invention will be described with reference to FIG. 7.

Figure 7:
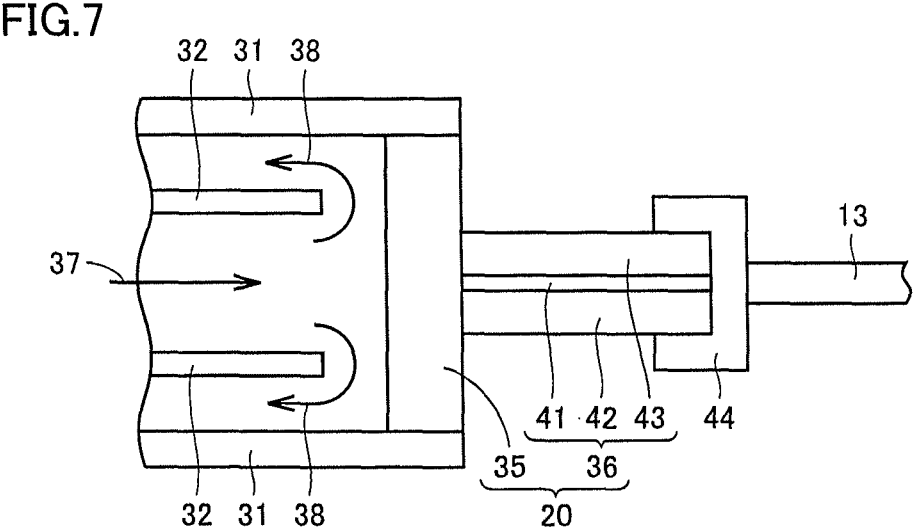
FIG. 7 is a schematic cross-sectional view for describing an apparatus for manufacturing a carbon nanostructure according to a third embodiment of the present invention.

Referring to FIG. 7, the apparatus for manufacturing the carbon nanostructure basically includes a configuration similar to that of the apparatus for manufacturing the carbon nanostructure shown in FIG. 5, although the former is different from the latter in terms of a configuration of used base body 20. In other words, iron foil is used as catalyst member 35 forming base body 20, and separation member 36 is configured by a catalyst thin film 41 formed of an iron foil film, and two fixing members 42 and 43 for sandwiching and holding catalyst thin film 41. Separation member 36 is grasped by a grasp member 44. Grasp member 44 is connected to coupling rod 13.

Next, a method for manufacturing the carbon nanostructure using the apparatus for manufacturing the carbon nanostructure shown in FIG. 7 will be described. Although the method for manufacturing the carbon nanostructure is basically similar to the method for manufacturing the carbon nanostructure using the apparatus for manufacturing the carbon nanostructure shown in FIG. 5, the former is different from the latter in terms of a configuration of base body 20 prepared in the preparation step (S10). In other words, when the apparatus shown in FIG. 7 is used, a member obtained by joining catalyst member 35 and separation member 36 described above is prepared as base body 20. An arbitrary method such as welding and pressure joining can be used as a method for joining catalyst member 35 and separation member 36. However, catalyst member 35 must be in contact with an end of catalyst thin film 41 of separation member 36.

As shown in FIG. 7, catalyst member 35 of prepared base body 20 is fixed to the end of diaphragm 31 and separation member 36 of prepared base body 20 is connected to coupling rod 13 with grasp member 44 interposed therebetween. Catalyst member 35 may be preliminarily fixed to the end of diaphragm 31.

Next, the oxidation step (S20) is performed similarly to the manufacturing method shown in FIG. 1. In this step, at least a part of the contact portion of catalyst member 35 and separation member 36 in base body 20 is oxidized. Specifically, by setting the atmosphere within reaction chamber 1 or diaphragm 31 (refer to FIG. 5) to the oxygen-containing atmosphere and heating base body 20 by heating member 4, base body 20 is oxidized.

Figure 8:
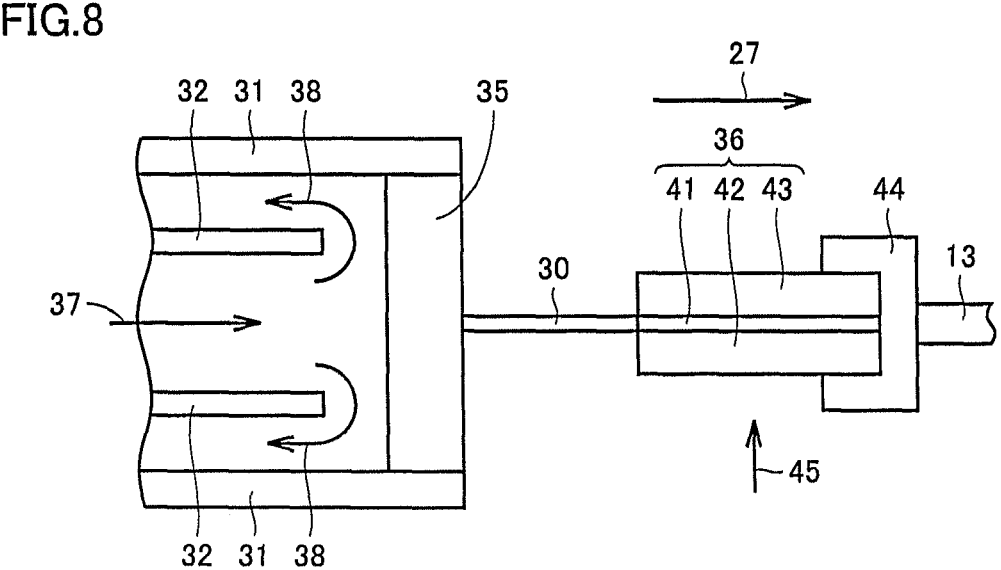
FIG. 8 is a schematic view showing the carbon nanostructure formed by the apparatus for manufacturing the carbon nanostructure shown in FIG. 7.
Figure 9:
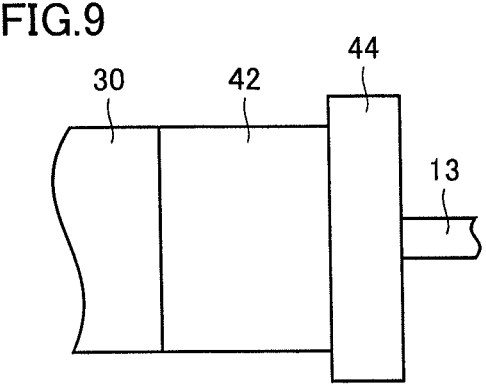
FIG. 9 is a schematic plan view of the carbon nanostructure shown in FIG. 8.

Next, the CNT growth step (S30) is performed similarly to the manufacturing method shown in FIG. 1. Specifically, in this step (S30), base body 20 is heated by heating member 4 and the carbon-containing source gas is supplied from the gas supply portion through guide tube 32 to the rear surface side of catalyst member 35. Then, with the source gas being in contact with base body 20 including catalyst member 35, separation member 36 is moved by driving member 2 (refer to FIG. 5) in a direction shown by an arrow 27 in FIG. 8. As a result, as shown in FIG. 8, carbon nanostructure 30 is grown in a separation interface region between catalyst member 35 and separation member 36. As shown in FIGS. 8 and 9, carbon nanostructure 30 thus formed has a sheet-like shape whose cross-sectional shape is the same as the shape of an end face of catalyst thin film 41. FIG. 9 is a schematic view of carbon nanostructure 30 and separation member 36 when viewed from a direction shown by an arrow 45 in FIG. 8.

With this, sheet-like carbon nanostructure 30 with reduced deformation such as a bend, which extends from catalyst member 35 to separation member 36, can be easily grown in the separation interface region between catalyst member 35 and separation member 36. In addition, by controlling the shape of catalyst thin film 41, the cross-sectional shape (shape of a cross section in a direction perpendicular to the direction shown by arrow 27 in FIG. 8) of the formed carbon nanostructure can be controlled.

(Fourth Embodiment)

An apparatus for manufacturing a carbon nanostructure according to a fourth embodiment of the present invention will be described with reference to FIG. 10.

Figure 10:
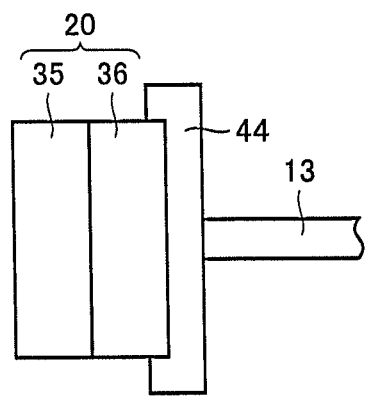
FIG. 10 is a schematic cross-sectional view for describing an apparatus for manufacturing a carbon nanostructure according to a fourth embodiment of the present invention.

Referring to FIG. 10, the apparatus for manufacturing the carbon nanostructure basically includes a configuration similar to that of the apparatus for manufacturing the carbon nanostructure shown in FIG. 5, although the former is different from the latter in terms of a configuration of used base body 20. In other words, catalyst member 35 forming base body 20 is formed of porous member 33 and catalyst 34 as shown in FIG. 5, and separation member 36 is formed of an iron block body (block body having a rectangular cross-sectional shape). Separation member 36 is grasped by grasp member 44. Grasp member 44 is connected to coupling rod 13.

Next, a method for manufacturing the carbon nanostructure using the apparatus for manufacturing the carbon nanostructure shown in FIG. 10 will be described. Although the method for manufacturing the carbon nanostructure is basically similar to the method for manufacturing the carbon nanostructure using the apparatus for manufacturing the carbon nanostructure shown in FIG. 5, the former is different from the latter in terms of a configuration of base body 20 prepared in the preparation step (S10). In other words, when the apparatus shown in FIG. 10 is used, a member obtained by joining catalyst member 35 and separation member 36 described above is prepared as base body 20. An arbitrary method such as welding and pressure joining can be used as a method for joining catalyst member 35 and separation member 36. However, catalyst member 35 must be in contact with separation member 36.

Catalyst member 35 of prepared base body 20 is fixed to the end of diaphragm 31 as shown in FIG. 5, and separation member 36 of prepared base body 20 is connected to coupling rod 13 with grasp member 44 interposed therebetween as shown in FIG. 10. Catalyst member 35 may be preliminarily fixed to the end of diaphragm 31.

Next, the oxidation step (S20) is performed similarly to the manufacturing method shown in FIG. 1. Specifically, by setting the atmosphere within reaction chamber 1 or diaphragm 31 (refer to FIG. 5) to the oxygen-containing atmosphere and heating base body 20 by heating member 4, base body 20 is oxidized.

Figure 11:
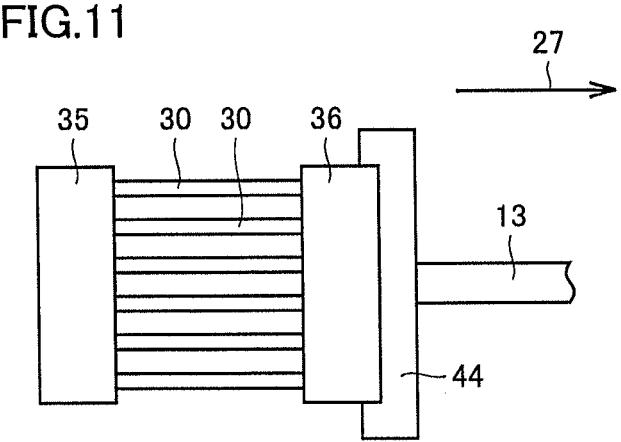
FIG. 11 is a schematic view showing the carbon nanostructure formed by the apparatus for manufacturing the carbon nanostructure shown in FIG. 10.

Next, the CNT growth step (S30) is performed similarly to the manufacturing method shown in FIG. 1. Specifically, in this step (S30), base body 20 is heated by heating member 4 (refer to FIG. 5) and the carbon-containing source gas is supplied from the gas supply portion through guide tube 32 (refer to FIG. 5) to the rear surface side of catalyst member 35. Then, with the source gas being in contact with base body 20 including catalyst member 35, separation member 36 is moved by driving member 2 (refer to FIG. 5) in a direction shown by an arrow 27 in FIG. 11. As a result, as shown in FIG. 11, carbon nanostructure 30 is grown in a separation interface region between catalyst member 35 and separation member 36. Carbon nanostructure 30 thus formed has a sheet-like shape whose cross-sectional shape is the same as the shape of an end face of separation member 36.

With this, sheet-like carbon nanostructure 30 with reduced deformation such as a bend, which extends from catalyst member 35 to separation member 36, can be easily grown in the separation interface region between catalyst member 35 and separation member 36. In addition, by controlling the shape of separation member 36, the cross-sectional shape (shape of a cross section in a direction perpendicular to the direction shown by arrow 27 in FIG. 11) of the formed carbon nanostructure can be controlled.

Figure 12:
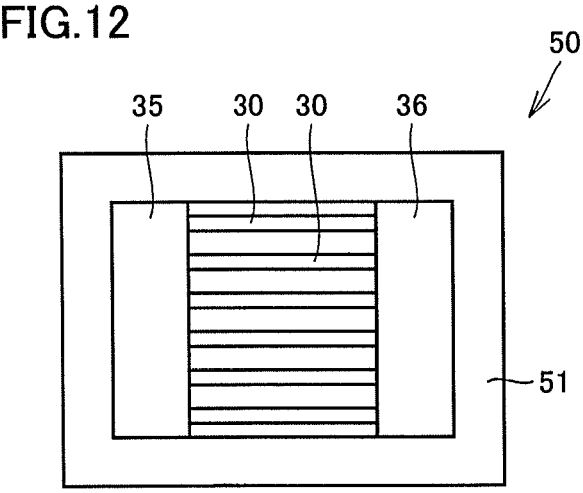
FIG. 12 is a schematic view of a carbon nanostructure assembly.

Thereafter, carbon nanostructure 30 is taken out from the manufacturing apparatus together with catalyst member 35 and separation member 36, and is fixed at a relative position by a frame body 51. Frame body 51 can have an arbitrary shape as long as frame body 51 can fix catalyst member 35 and separation member 36 such that carbon nanostructure 30 can be maintained straight, and frame body 51 may have, for example, a rectangular shape as shown in FIG. 12. Catalyst member 35 and separation member 36 are fixed to the inner circumferential side of rectangular frame body 51. A carbon nanostructure assembly 50 can be thus formed. With such carbon nanostructure assembly 50, the carbon nanostructure whose shape is maintained straight can be easily handled.

(Fifth Embodiment)

A method for manufacturing a carbon nanostructure according to a fifth embodiment of the present invention will be described with reference to FIG. 13.

Figure 13:
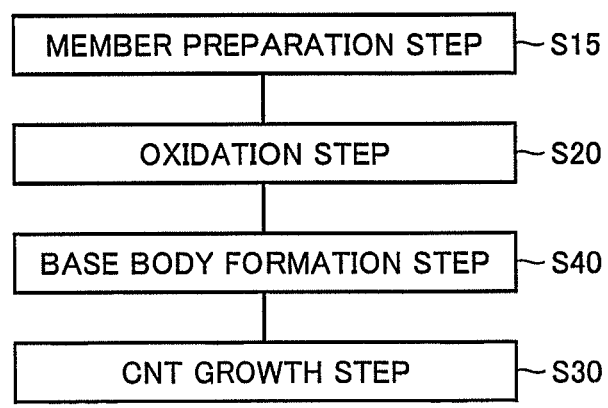
FIG. 13 is a flowchart showing a method for manufacturing a carbon nanostructure according to a fifth embodiment of the present invention.
Figure 14:
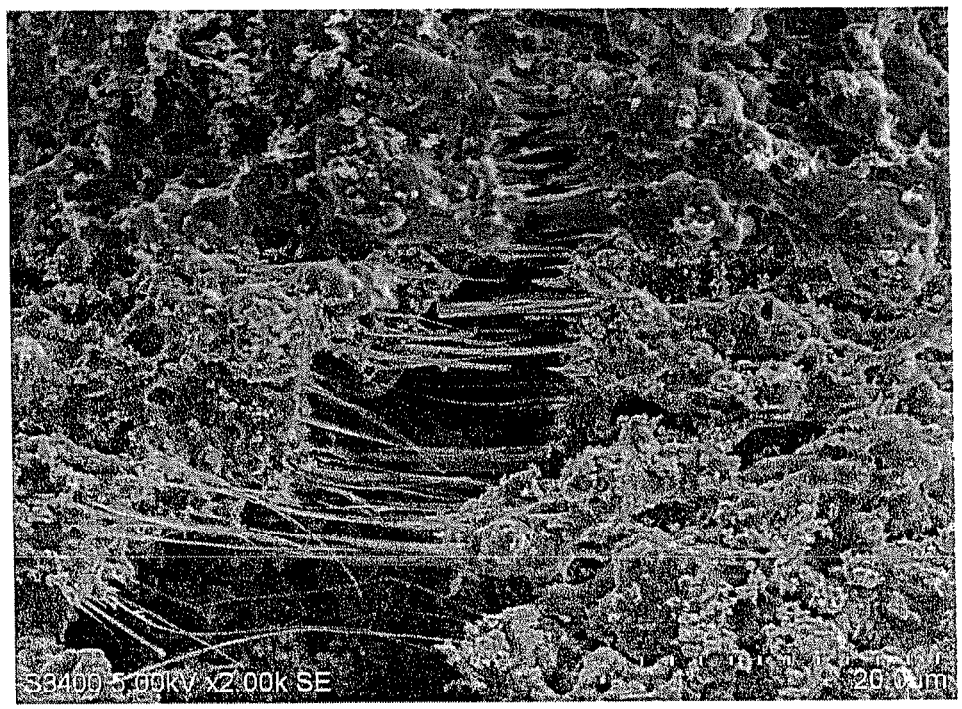
FIG. 14 is a scanning electron microscope photograph showing a carbon nanostructure formed in Experiment 1.
Figure 15:
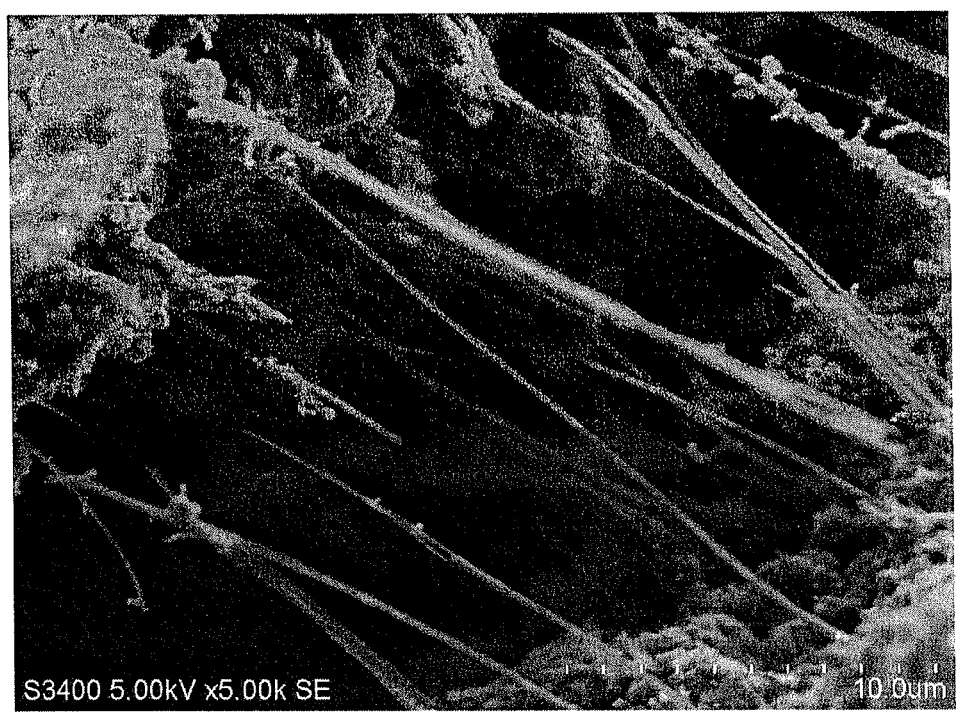
FIG. 15 is a scanning electron microscope photograph showing the carbon nanostructure formed in Experiment 1.
Figure 16:
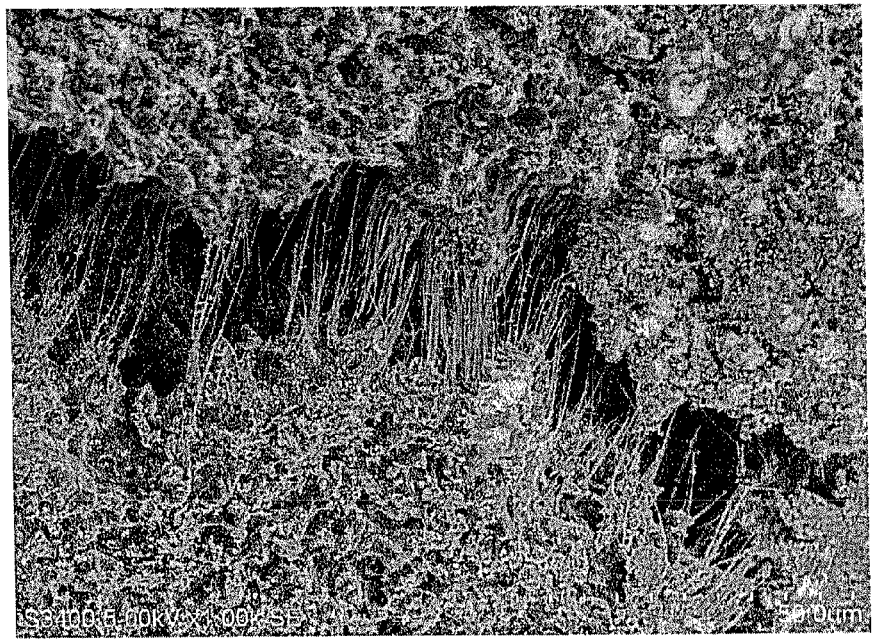
FIG. 16 is a scanning electron microscope photograph showing the carbon nanostructure formed in Experiment 1.
Figure 17:
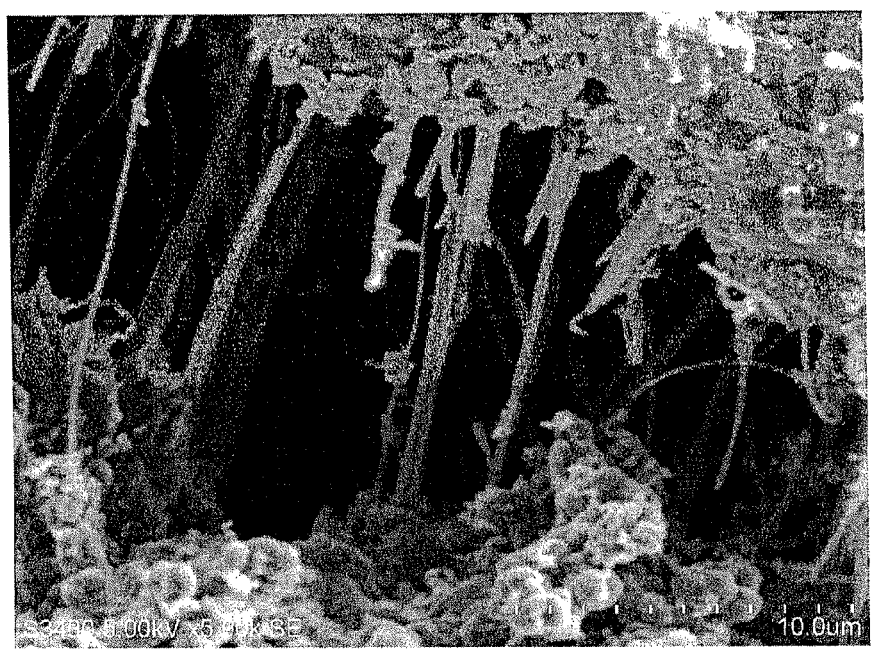
FIG. 17 is a scanning electron microscope photograph showing the carbon nanostructure formed in Experiment 1.

Although the method for manufacturing the carbon nanostructure shown in FIG. 13 basically includes a configuration similar to that of the method for manufacturing the carbon nanostructure shown in FIG. 1, the former is different from the latter in that the catalyst member and the separation member are preliminarily oxidized before the base body is formed. In other words, in the method for manufacturing the carbon nanostructure shown in FIG. 13, a member preparation step (S15) is first performed. In this step (S15), catalyst member 35 and separation member 36 are prepared.

Next, the oxidation step (S20) is performed. In this step (S20), catalyst member 35 and separation member 36 are oxidized. An arbitrary method can be used as a method for oxidation. For example, a method for heating catalyst member 35 and separation member 36 in the atmosphere can be used.

Next, a base body formation step (S40) is performed. In this step (S40), catalyst member 35 and separation member 36 are joined. Similarly to the manufacturing method shown in FIG. 1, an arbitrary method can be used as a method for joining.

Next, the CNT growth step (S30) is performed similarly to the manufacturing method shown in FIG. 1. With this as well, the carbon nanostructure with reduced bend can be obtained similarly to the manufacturing method shown in FIG. 1.

Now, characteristic features of the present invention will be listed, although they may partially be redundant as seen in the embodiments described above.

The method for manufacturing the carbon nanostructure according to the present invention includes the steps of: preparing base body 20 formed of catalyst member 35 including the catalyst and separation member 36 that are in contact with or integral with each other (preparation step (S20)); oxidizing at least a part of the contact portion or integral portion of catalyst member 35 and separation member 36 in base body 20 (oxidation step (S20)); bringing the carbon-containing source gas into contact with catalyst member 35 and/or separation member 36 (CNT growth step (S30)); and growing the carbon nanostructure (CNT growth step (S30)). In the CNT growth step (S30), carbon nanostructure 30 is grown in the separation interface region between catalyst member 35 and separation member 36, by heating base body 20 while separating separation member 36 from catalyst member 35.

With this, carbon nanostructure 30 with reduced deformation such as a bend, which extends from catalyst member 35 to separation member 36, can be easily grown in the separation interface region between catalyst member 35 and separation member 36. In addition, since at least a part of the contact portion of catalyst member 35 and separation member 36 is preliminarily oxidized, carbon nanostructure 30 can be efficiently grown in the CNT growth step (S30) of growing carbon nanostructure 30.

In the method for manufacturing the carbon nanostructure described above, in the CNT growth step (S30) of growing the carbon nanostructure, carbon nanostructure 30 may be grown to connect catalyst member 35 and separation member 36 in the separation interface region. In this case, carbon nanostructure 30 is grown while separation member 36 is separated from catalyst member 35. Therefore, carbon nanostructure 30 can be reliably maintained under a certain tension, and thus, straight carbon nanostructure 30 can be obtained.

In the method for manufacturing the carbon nanostructure described above, carbon nanostructure 30 may have one type of shape selected from the group consisting of a pillar shape, a cylindrical shape and a tape shape.

In the method for manufacturing the carbon nanostructure described above, the oxidation step (S20) and the step of bringing the carbon-containing source gas into contact with catalyst member 35 and/or separation member 36 (CNT growth step (S30)) may be performed simultaneously. The step of bringing the carbon-containing source gas into contact with catalyst member 35 and/or separation member 36 (CNT growth step (S30)) and the step of growing the carbon nanostructure (CNT growth step (S30)) may also be performed simultaneously. The three steps of the oxidation step (S20), the step of bringing into contact in the CNT growth step (S30), and the step of growing the carbon nanostructure in this step (S30) may also be performed simultaneously. In this case, the process of manufacturing carbon nanostructure 30 can be simplified. By performing the oxidation step (S20), and then, causing oxygen to be contained in the source gas used in the CNT growth step (S30), the oxidation process may be performed simultaneously with the step of growing the carbon nanostructure.

In the method for manufacturing the carbon nanostructure described above, in the CNT growth step (S30) of growing the carbon nanostructure, a tension may be applied to carbon nanostructure 30 through at least one of catalyst member 35 and separation member 36. In this case, by controlling the tension, carbon nanostructure 30 with reduced bend can be obtained reliably.

In the method for manufacturing the carbon nanostructure described above, in the preparation step (S10), base body 20 may be prepared by joining catalyst member 35 and separation member 36. In the CNT growth step (S30) of growing carbon nanostructure 30, separation member 36 may be separated from catalyst member 35 by fracturing the joint portion where catalyst member 35 and separation member 36 are joined. In this case, by controlling the shape and the like of the joint portion of catalyst member 35 and separation member 36 and causing the fracture to occur at the joint portion, the shape of the portion where carbon nanostructure 30 is formed and the shape of carbon nanostructure 30 can be controlled.

In the method for manufacturing the carbon nanostructure described above, in the step of bringing the carbon-containing source gas into contact with catalyst member 35 and/or separation member 36 in the CNT growth step (S30), the source gas may be brought into contact with catalyst member 35 in a region other than the separation interface region, whereas an atmospheric gas (such as, for example, an argon gas) having a different composition from that of the source gas may be supplied to the separation interface region. In this case, the source gas that may degrade the quality of carbon nanostructure 30 is not directly brought into contact with the separation interface region where carbon nanostructure 30 is grown. Therefore, high-quality carbon nanostructure 30 can be obtained.

In the method for manufacturing the carbon nanostructure described above, separation member 36 may include a separation-side catalyst (e.g., the pure iron block forming separation member 36 in FIG. 5 or catalyst thin film 41 in FIG. 7), and in the preparation step (S10) of preparing the base body, base body 20 may be prepared, which includes a shape defining member for defining the shape of the contact region of the catalyst included in catalyst member 35 and separation member 36 (e.g., porous member 33 in FIG. 5 or fixing members 42 and 43 in FIG. 7) in the contact portion of catalyst member 35 and separation member 36. In the CNT growth step (S30) of growing the carbon nanostructure, catalyst member 35 and separation member 36 may be separated in the contact region having the shape defined by the shape defining member. In this case, by controlling the shape of the contact region, the cross-sectional shape of formed carbon nanostructure 30 can be controlled. In other words, carbon nanostructure 30 having an arbitrary cross-sectional shape can be obtained.

In the method for manufacturing the carbon nanostructure described above, either one of the catalyst of catalyst member 35 and the separation-side catalyst of separation member 36 may have a filament-like shape or a sheet-like shape as shown in FIGS. 5, 7 and the like. In this case, linear or sheet-like carbon nanostructure 30 can be easily obtained.

In the method for manufacturing the carbon nanostructure described above, the shape defining member may be porous member 33 having a plurality of openings as shown in FIG. 5.

Catalyst member 35 may be formed of porous member 33 and catalyst 34 filled into the openings of porous member 33. In the preparation step (S10) of preparing the base body, base body 20 may be prepared by bringing the separation-side catalyst of separation member 36 (the pure iron block forming separation member 36 in FIG. 7) into contact with catalyst 34 exposed from the openings of catalyst member 35 or joining the separation-side catalyst to catalyst 34. In this case, linear carbon nanostructure 30 can be easily obtained.

In the method for manufacturing the carbon nanostructure described above, porous member 33 may be nanoporous alumina or nanoporous silicon. In this case, the size and the like of the openings of porous member 33 can be controlled relatively easily, and thus, the end face size of catalyst 34 filled into the openings can be easily controlled. As a result, the cross-sectional size of formed carbon nanostructure 30 can be easily controlled.

In the method for manufacturing the carbon nanostructure described above, separation member 36 may be formed of catalyst thin film 41 serving as the sheet-like separation-side catalyst, and fixing members 42 and 43 serving as the shape defining member that grasps catalyst thin film 41 with the end face of catalyst thin film 41 exposed, as shown in FIG. 7. In the preparation step (S10) of preparing the base body, base body 20 may be prepared by bringing the separation-side catalyst (catalyst thin film 41) into contact with the catalyst included in catalyst member 35 (the pure iron block forming catalyst member 35 in FIG. 7) or joining the separation-side catalyst to the catalyst. In this case, sheet-like carbon nanostructure 30 can be easily obtained.

In the method for manufacturing the carbon nanostructure described above, in the preparation step (S10) of preparing the base body, a single member (e.g., pure iron foil) formed of the catalyst may be prepared as base body 20, as shown in FIGS. 2, 3 and the like. In the oxidation step (S20), at least a part of the single member may be oxidized. In the step of bringing the source gas into contact with catalyst member 35 and/or separation member 36 in the CNT growth step (S30), the source gas may be brought into contact with the single member. In the CNT growth step (S30) of growing the carbon nanostructure, the source gas may be brought into contact with base body 20 that is the single member, and then, (or with the source gas being in contact with base body 20), by heating base body 20 while fracturing base body 20 to separate base body 20 into two portions (base body portions 25 and 26 in FIG. 4), carbon nanostructure 30 may be grown in the separation interface region between two base body portions 25 and 26. The catalyst member and the separation member may be above-described two base body portions 25 and 26 obtained by fracturing base body 20 that is the single member. In this case, by using the single member as base body 20, the process of manufacturing carbon nanostructure 30 can be simplified as compared with the case of performing the step of integrating the catalyst member and the separation member.

In the method for manufacturing the carbon nanostructure described above, the catalyst included in catalyst member 35 and the separation-side catalyst (e.g., catalyst thin film 41 and the like) included in separation member 36 may include metal in which carbon dissolves. In this case, carbon in the source gas is carburized into the metal and carbon nanostructure 30 can be easily grown on a surface of the metal.

In the method for manufacturing the carbon nanostructure described above, the metal may be one type of metal selected from the group consisting of iron, nickel and cobalt. In this case, carbon nanostructure 30 can be reliably grown on the surface of the metal.

As shown in FIGS. 2 and 5, the apparatus for manufacturing the carbon nanostructure according to the present invention includes: a holding portion (base platform 8 and quartz blocks 9 to 12 in FIG. 2 or diaphragm 31 and coupling rod 13 in FIG. 5); driving member 2; gas supply portion 3; and heating member 4. The holding portion is capable of holding base body 20 formed of catalyst member 35 including the catalyst and separation member 36 that are in contact with or integral with each other, on the catalyst member side and on the separation member side. Driving member 2 moves the holding portion (quartz blocks 11 and 12 in the manufacturing apparatus shown in FIG. 2 or coupling rod 13 in the manufacturing apparatus shown in FIG. 5) to separate separation member 36 from catalyst member 35. Gas supply portion 3 supplies a reaction gas to base body 20. Heating member 4 heats base body 20. By using such apparatus, carbon nanostructure 30 with reduced bend can be grown in the separation interface region between catalyst member 35 and separation member 36 or in the fracture interface between base body portions 25 and 26 obtained by fracturing base body 20 as shown in FIG. 4.

As shown in FIG. 12, carbon nanostructure assembly 50 according to the present invention includes: a holding member (catalyst member 35 and separation member 36 in FIG. 12) including a pair of holding portions arranged to face each other; and a plurality of carbon nanostructures 30 formed to connect the pair of holding portions. With this, carbon nanostructure 30 having a tension applied between the holding portions can be easily handled as carbon nanostructure assembly 50. Carbon nanostructure assembly 50 may also include a holding member (frame body 51) for fixing a relative position of catalyst member 35 and separation member 36. In carbon nanostructure assembly 50 described above, carbon nanostructure 30 may have a sheet-like shape. In carbon nanostructure assembly 50 described above, the holding portion may also include the catalyst for forming carbon nanostructure 30.

EXPERIMENT 1

(About Sample in Example)

An experiment described below was conducted in order to check the effect of the present invention. First, pure iron foil (purity of 5N) having a thickness of 50 μm was prepared as the base body. Then, the base body formed of the pure iron foil was held by quartz blocks 9 to 12 as shown in FIG. 3. The base body was subjected to heat treatment (oxidation treatment) in the atmosphere under the following conditions: the heating temperature of 850° C. and the heat treatment time of 1 minute. Thereafter, an Ar gas (argon gas) was flown into the reaction chamber of the heating furnace, and oxygen was discharged from the reaction chamber of the heating furnace.

Next, while the source gas that was the Ar gas containing 5% of acetylene gas was supplied to the base body between quartz block 9 and quartz block 11, heat treatment was performed at the heating temperature of 850° C. While the heat treatment was performed in the source gas for 7 minutes at the heating temperature of 850° C., a tension was applied to the base body formed of the pure iron foil, to fracture the iron foil. As a result, fiber-like carbon serving as the carbon nanostructure was grown to connect the fracture surfaces of the fractured pure iron foil.

FIGS. 14 to 17 show scanning electron microscope photographs of the formed fiber-like carbon. As shown in FIGS. 14 to 17, it can be seen that fiber-like carbon (carbon nanofiber), and locally, tape-like carbon (carbon nanotape) are grown to connect the fracture surfaces of the pure iron foil that is the base body.

(About Sample in Comparative Example)

In Comparative Example, without performing the heat treatment (oxidation treatment) in the atmosphere, the heat treatment was performed on the base body formed of the pure iron foil in the above-described source gas under the following conditions: the heating temperature of 850° C. and the heat treatment time of 7 minutes, and then, the base body was fractured. As a result, growth of the fiber-like carbon to connect the fracture surfaces was not seen.

EXPERIMENT 2

An experiment described below was conducted in order to investigate an influence of the treatment time in the heat treatment after the oxidation treatment.

Figure 18:
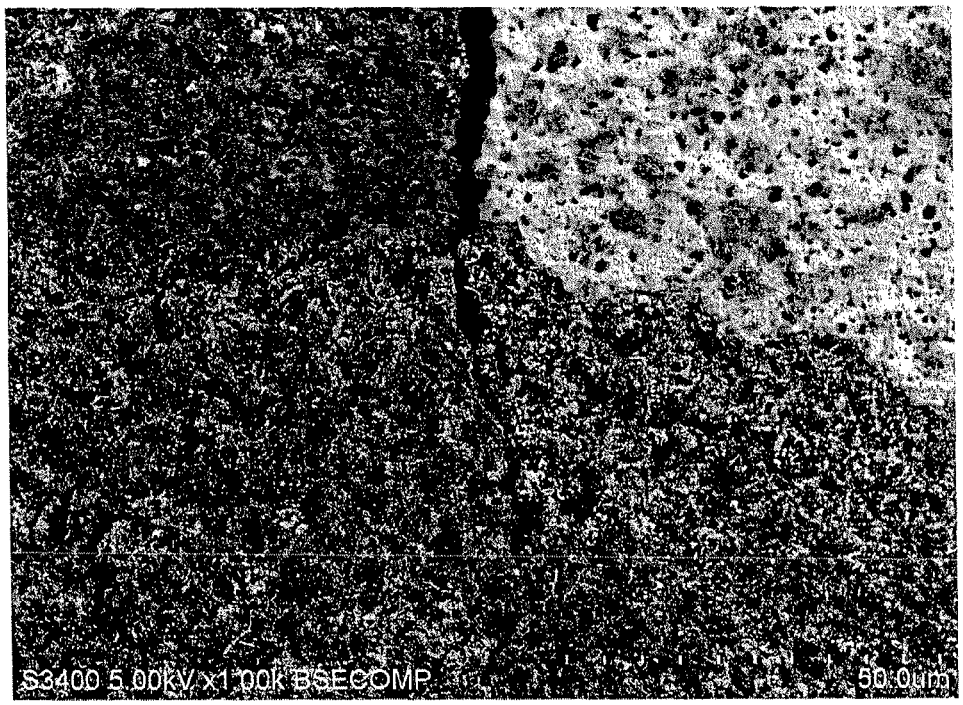
FIG. 18 is a scanning electron microscope photograph showing a growth state of a carbon nanostructure in Experiment 2.
Figure 19:
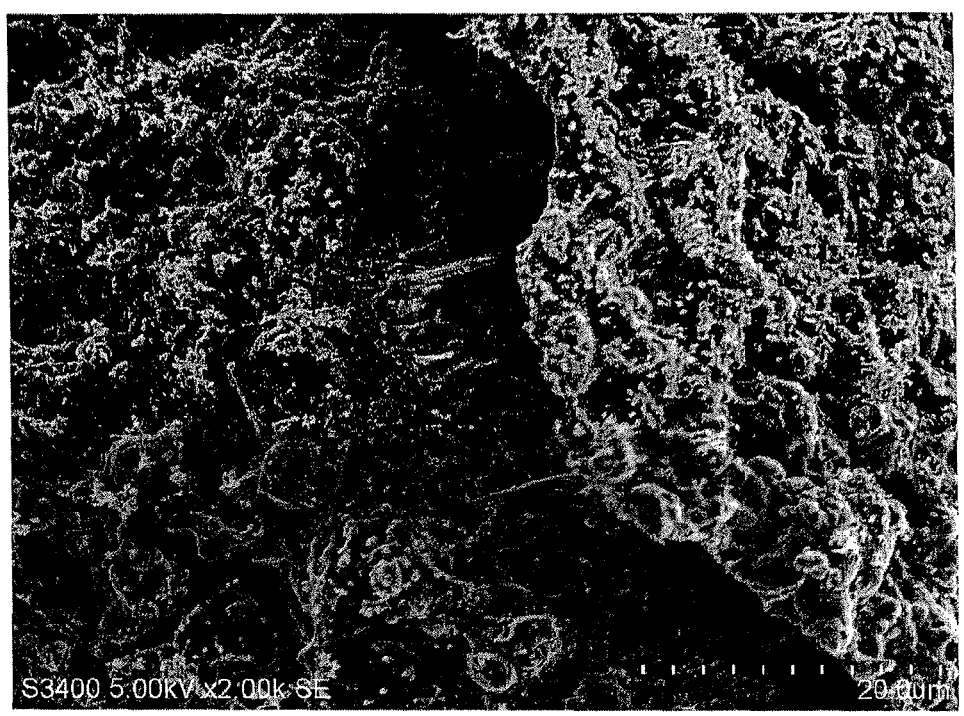
FIG. 19 is a scanning electron microscope photograph showing a growth state of the carbon nanostructure in Experiment 2.
Figure 20:
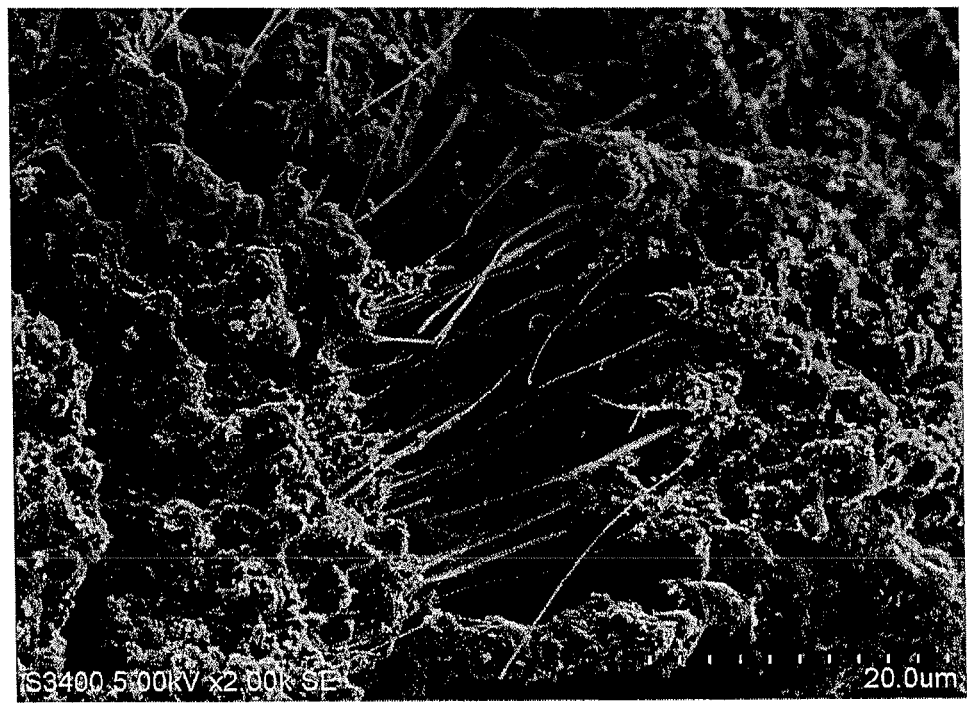
FIG. 20 is a scanning electron microscope photograph showing a growth state of the carbon nanostructure in Experiment 2.
Figure 21:
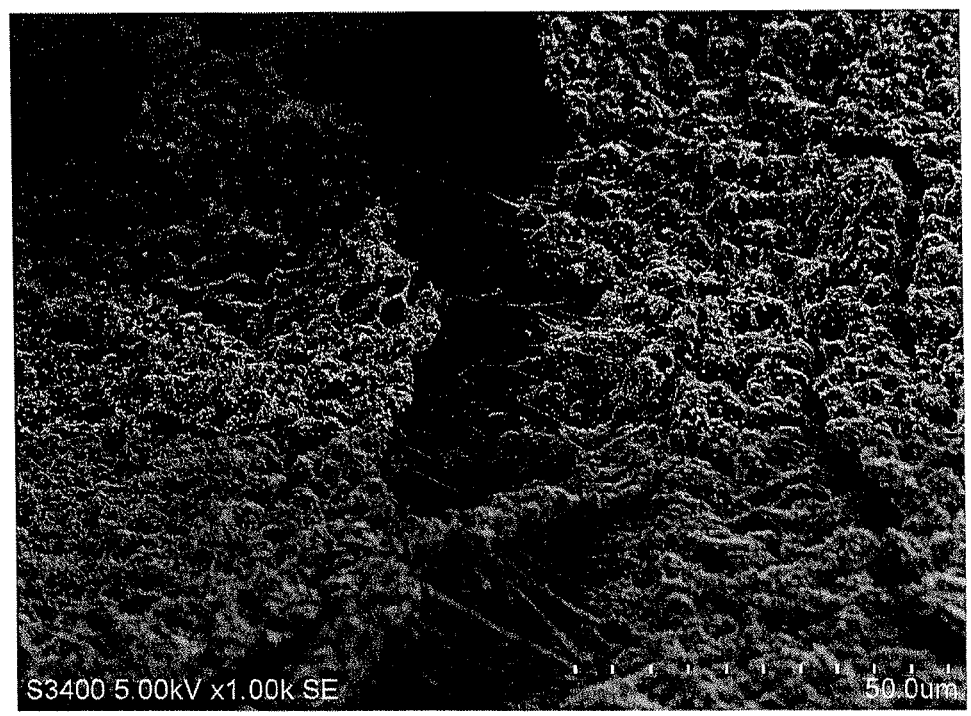
FIG. 21 is a scanning electron microscope photograph showing a growth state of the carbon nanostructure in Experiment 2.
Figure 22:
FIG. 22 is a scanning electron microscope photograph showing a growth state of the carbon nanostructure in Experiment 2.

Specifically, the base body similar to that in Example in Experiment 1 was prepared, and the oxidation treatment and the heat treatment (heat treatment in the source gas) similar to those in Example were performed. In the heat treatment, by applying a tension to the base body while performing the heat treatment at the predetermined heating temperature (850° C.), a crack was produced. Then, a portion where the crack had been produced was observed. The result is shown in FIGS. 18 to 22. FIG. 18 is a scanning electron microscope photograph of a portion near the crack in the base body when 2 minutes have elapsed from the start of the heat treatment. FIGS. 19 to 22 are scanning electron microscope photographs of the portion near the crack in the base body when 4 minutes, 7 minutes, 10 minutes, and 60 minutes have elapsed from the start of the heat treatment, respectively.

As shown in FIGS. 18 to 22, it can be seen that the fiber-like carbon is hardly grown when 2 minutes have elapsed from the start of the heat treatment (refer to FIG. 18), whereas the fiber-like carbon is grown in the crack when approximately 4 to 7 minutes have elapsed from the start of the heat treatment. It can be seen that iron oxide which is not yet reduced remains in the portion near the crack when 2 minutes have elapsed from the start of the heat treatment (refer to the white part having fine holes in FIG. 18). On the other hand, as a result of observation of the portion near the crack, it can be seen that the iron oxide is reduced and carburized and carbon is precipitated when 7 minutes have elapsed from the start of the heat treatment (refer to FIG. 20).

EXPERIMENT 3

The separation member, which was formed of an iron block having 100 μm-thick pure iron foil on a surface thereof, and the catalyst member, which was formed of a nanoporous alumina plate in which iron was filled into a through hole having a diameter of 20 nm, were joined by arc welding. Base body 20 as shown in FIG. 5 was thus formed. Thereafter, while the argon gas having an oxygen concentration of 10% was sprayed from a surface of the nanoporous alumina plate opposite to the arc-welded surface, the heat treatment (oxidation treatment) was performed on base body 20 under the following conditions: the heating temperature of 800° C. and the heat treatment time of 10 minutes. Thereafter, the heat treatment was performed on base body 20 under the conditions similar to those of the heat treatment in Experiment 1 (i.e., heat treatment in the source gas at the heating temperature of 850° C.). Then, after the start of the heat treatment, a tension was applied to the base body to fracture the arc-welded portion. As a result, growth of carbon nanofiber was seen between the fracture surfaces where the iron filled into the nanoporous alumina was peeled off from the pure iron foil.

EXPERIMENT 4

The base body having the same configuration as that of base body 20 used in Experiment 3 was prepared, and the oxidation treatment and the heat treatment were performed similarly. After the start of the heat treatment, a tension was applied to the base body to fracture the arc-welded portion in the base body. As a result, growth of carbon nanofiber was seen between the fracture surfaces as in Experiment 3.

EXPERIMENT 5

The catalyst member and the separation member used in Experiment 3 were prepared, and the oxidation treatment was performed before joining the catalyst member and the separation member. The treatment conditions of the oxidation treatment were similar to those of the oxidation treatment in Experiment 3. Thereafter, the catalyst member and the separation member that had been subjected to the oxidation treatment were arc-welded to form the base body. Furthermore, the heat treatment similar to that in Experiment 3 was performed on the base body, and after the start of the heat treatment, a tension was applied to the base body to fracture the arc-welded portion. As a result, growth of carbon nanofiber was seen between the fracture surfaces.

EXPERIMENT 6

The separation member, which was formed of an iron block having 100 μm-thick pure iron foil on a surface thereof, and the catalyst member, which was formed of a gold plate in which an iron filament having a diameter of 50 nm penetrated from a front surface to a rear surface thereof, were joined by pressure joining. Base body 20 as shown in FIG. 5 was thus formed. Thereafter, while the argon gas having an oxygen concentration of 1% was sprayed to the joining interface between the catalyst member and the separation member, the heat treatment (oxidation treatment) was performed on base body 20 under the following conditions: the heating temperature of 800° C. and the heat treatment time of 5 minutes. Thereafter, the heat treatment was performed in the source gas formed of an ethylene gas containing 100 ppm of oxygen under the following conditions: the heating temperature of 850° C. Then, after the start of the heat treatment, a tension was applied to the base body to fracture the joint portion. As a result, growth of carbon nanofiber was seen between the fracture surfaces.

EXPERIMENT 7

The separation member, which was formed of an iron block having 50 μm-thick pure iron foil on a surface thereof, and the catalyst member, which was formed of an iron block having, on a surface thereof, a surface layer obtained by simultaneous deposition of iron and alumina, were joined by thermal pressure joining such that the surface layer was located at the joining interface. The base body was thus formed. Thereafter, while the argon gas having an oxygen concentration of 1% was sprayed to the joining interface between the catalyst member and the separation member, the heat treatment (oxidation treatment) was performed on base body 20 under the following conditions: the heating temperature of 800° C. Thereafter, the heat treatment was performed in the source gas formed of an acetylene gas containing 500 ppm of water under the following conditions: the heating temperature of 850° C. Then, after the start of the heat treatment, a tension was applied to the base body to fracture the joint portion. As a result, growth of carbon nanofiber was seen between the fracture surfaces.

EXPERIMENT 8

The catalyst member, which was formed of 50 μm-thick pure iron foil, and the separation member, which was formed of an iron sheet grasped and fixed by fixing members 42 and 43 (refer to FIG. 7) formed of quartz blocks, were prepared. Then, as shown in FIG. 7, the catalyst member and the separation member were joined such that an end face of the iron sheet was in contact with the pure iron foil which was the catalyst member. Thereafter, the oxidation treatment and the heat treatment similar to those in Experiment 3 were performed. After the start of the heat treatment, a tension was applied to the base body to fracture the joint portion. As a result, growth of carbon nanofiber was seen between the fracture surfaces between the catalyst member and the end face of the iron sheet.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method for manufacturing a carbon nanostructure, comprising the steps of:
   preparing a base body formed of a catalyst member including a catalyst and a separation member that are in contact with or integral with each other;
   oxidizing at least a part of a contact portion or integral portion of said catalyst member and said separation member in said base body;
   bringing a carbon-containing source gas into contact with said catalyst member and/or said separation member; and
   growing a carbon nanostructure straight along a prescribed direction in a separation interface region between said catalyst member and said separation member, by heating said base body while separating said separation member from said catalyst member along said prescribed direction.

2. The method for manufacturing a carbon nanostructure according to claim 1, wherein
   in said step of growing a carbon nanostructure, the carbon nanostructure is grown to connect said catalyst member and said separation member in said separation interface region.

3. The method for manufacturing a carbon nanostructure according to claim 1, wherein
   said carbon nanostructure has one type of shape selected from the group consisting of a pillar shape, a cylindrical shape and a tape shape.

4. The method for manufacturing a carbon nanostructure according to claim 1, wherein
   said step of bringing into contact and said step of growing a carbon nanostructure are performed simultaneously.

5. The method for manufacturing a carbon nanostructure according to claim 1, wherein
   in said step of growing a carbon nanostructure, a tension is applied to said carbon nanostructure through at least one of said catalyst member and said separation member.

6. The method for manufacturing a carbon nanostructure according to claim 1, wherein
   in said step of preparing a base body, said base body is prepared by joining said catalyst member and said separation member, and
   in said step of growing a carbon nanostructure, said separation member is separated from said catalyst member by fracturing a joint portion where said catalyst member and said separation member are joined.

7. The method for manufacturing a carbon nanostructure according to claim 1, wherein
   said separation member includes a separation-side catalyst,
   in said step of preparing a base body, said base body is prepared, which includes a shape defining member for defining a shape of a contact region of said catalyst included in said catalyst member and said separation-side catalyst included in said separation member, in said contact portion of said catalyst member and said separation member, and
   in said step of growing a carbon nanostructure, said catalyst member and said separation member are separated in said contact region having the shape defined by said shape defining member.

8. The method for manufacturing a carbon nanostructure according to claim 7, wherein
   said shape defining member is a porous member having a plurality of openings,
   said catalyst member is formed of said porous member and said catalyst filled into said openings of said porous member, and
   in said step of preparing a base body, said base body is prepared by bringing said separation-side catalyst of said separation member into contact with said catalyst exposed from said openings of said catalyst member or joining said separation-side catalyst to said catalyst.

9. The method for manufacturing a carbon nanostructure according to claim 8, wherein
   said porous member is nanoporous alumina or nanoporous silicon.

10. The method for manufacturing a carbon nanostructure according to claim 1, wherein
    said catalyst includes metal in which carbon dissolves.

11. The method for manufacturing a carbon nanostructure according to claim 10, wherein
    said metal is one type of metal selected from the group consisting of iron, nickel and cobalt.

12. A method for manufacturing a carbon nanostructure, comprising the steps of:
    preparing a base body formed of a catalyst member including a catalyst and a separation member that are in contact with or integral with each other;
    oxidizing at least a part of a contact portion or integral portion of said catalyst member and said separation member in said base body;
    bringing a carbon-containing source gas into contact with said catalyst member and/or said separation member; and
    growing a carbon nanostructure in a separation interface region between said catalyst member and said separation member, by heating said base body while separating said separation member from said catalyst member
    wherein
    said step of oxidizing and said step of bringing into contact are performed simultaneously.

13. A method for manufacturing a carbon nanostructure, comprising the steps of:
- preparing a base body formed of a catalyst member including a catalyst and a separation member that are in contact with or integral with each other;
- oxidizing at least a part of a contact portion or integral portion of said catalyst member and said separation member in said base body;
- bringing a carbon-containing source gas into contact with said catalyst member and/or said separation member; and
- growing a carbon nanostructure in a separation interface region between said catalyst member and said separation member, by heating said base body while separating said separation member from said catalyst member, wherein in said step of bringing into contact, said source gas is brought into contact with said catalyst member in a region other than said separation interface region, whereas an atmospheric gas having a different composition from that of said source gas is supplied to said separation interface region.

14. A method for manufacturing a carbon nanostructure, comprising the steps of:
- preparing a base body formed of a catalyst member including a catalyst and a separation member that are in contact with or integral with each other;
- oxidizing at least a part of a contact portion or integral portion of said catalyst member and said separation member in said base body;
- bringing a carbon-containing source gas into contact with said catalyst member and/or said separation member; and
- growing a carbon nanostructure in a separation interface region between said catalyst member and said separation member, by heating said base body while separating said separation member from said catalyst member, wherein in said step of preparing a base body, a single member formed of a catalyst is prepared as said base body, in said step of oxidizing, at least a part of said single member is oxidized, in said step of bringing into contact, said source gas is brought into contact with said single member, in said step of growing a carbon nanostructure, by heating said single member while fracturing said single member to separate said single member into two portions, said carbon nanostructure is grown in said separation interface region between said two portions, and said catalyst member and said separation member are said two portions obtained by fracturing said single member.

* * * * *